United States Patent [19]
Tadmor et al.

[11] 3,866,890
[45] Feb. 18, 1975

[54] APPARATUS FOR SIMULTANEOUS PLASTICATING AND MIXING

[75] Inventors: Zehev Tadmor, Haifa, Israel; Imrich Klein, Highland Park, N.J.

[73] Assignee: Scientific Process & Research Inc., Highland Park, N.J.

[22] Filed: Nov. 13, 1973

[21] Appl. No.: 415,389

[52] U.S. Cl. ............................................. 259/191
[51] Int. Cl. ............................. B29b 1/04, B29b 1/06
[58] Field of Search ......... 259/191, 192, 193, 9, 10, 259/97, 25, 26, 45, 46, 109, 110; 198/213, 214; 100/144, 145; 425/207, 208

[56] References Cited
UNITED STATES PATENTS

| | | | |
|---|---|---|---|
| 3,650,652 | 3/1972 | Dray | 425/208 |
| 3,689,182 | 9/1972 | Kovacs | 259/191 |
| 3,737,151 | 6/1973 | Schaeffer | 259/191 |
| 3,762,693 | 10/1973 | DeBoo | 259/191 |

*Primary Examiner*—Robert W. Jenkins
*Attorney, Agent, or Firm*—Samuelson & Jacob

[57] ABSTRACT

Apparatus for plasticating and mixing a basic material and a desired ingredient such that the ingredient is effectively mixed throughout the mixture as the mixture is plasticated, the apparatus including a barrel and a screw conveyor having a main flight defining a channel for the basic material and an auxiliary flight defining an auxiliary channel for the ingredient, the channels being so related as to assure mixing of the ingredient with the basic material during plasticating.

18 Claims, 8 Drawing Figures

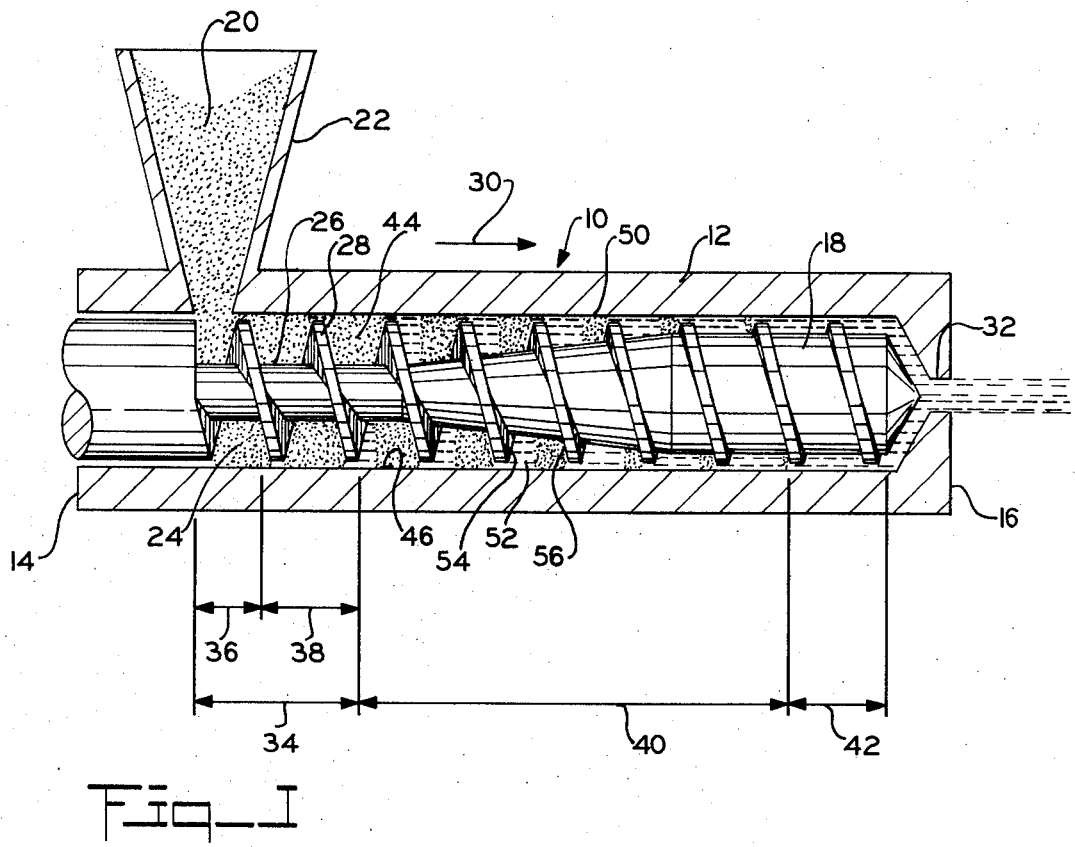
Fig_1
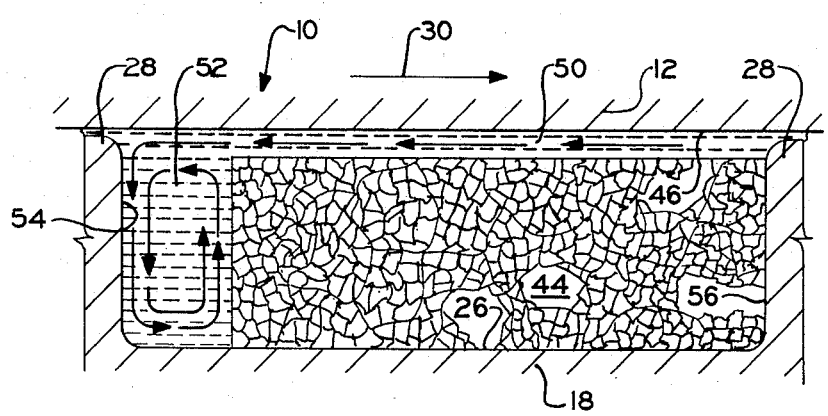
Fig_2

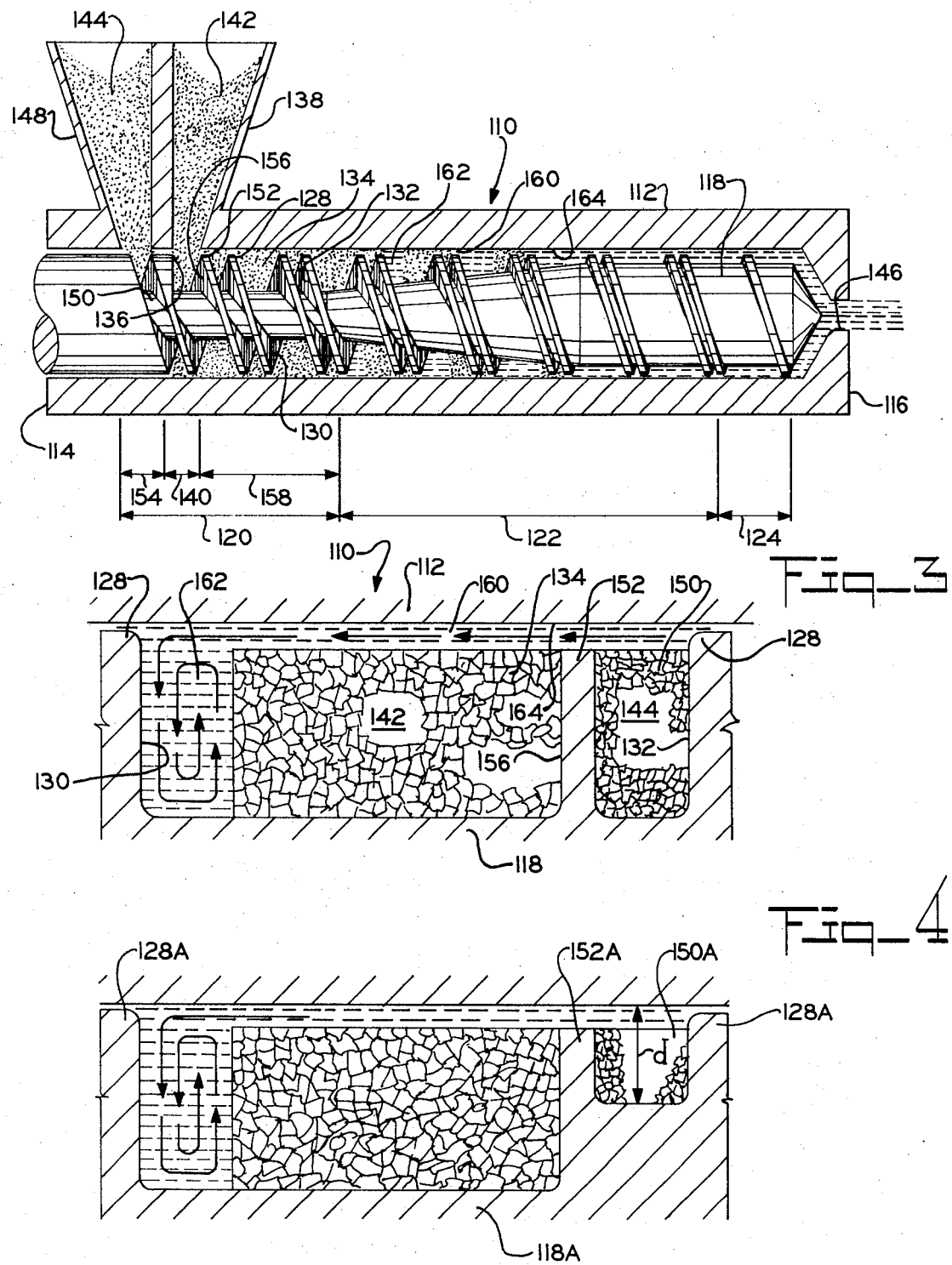

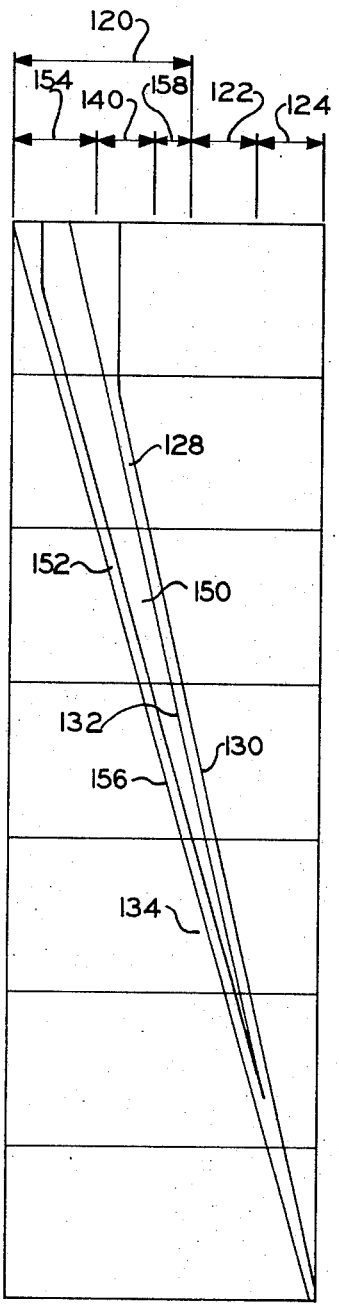
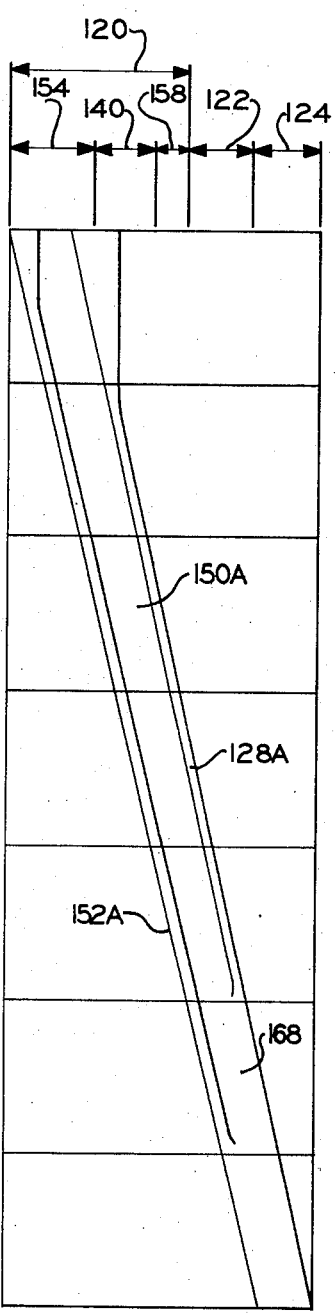
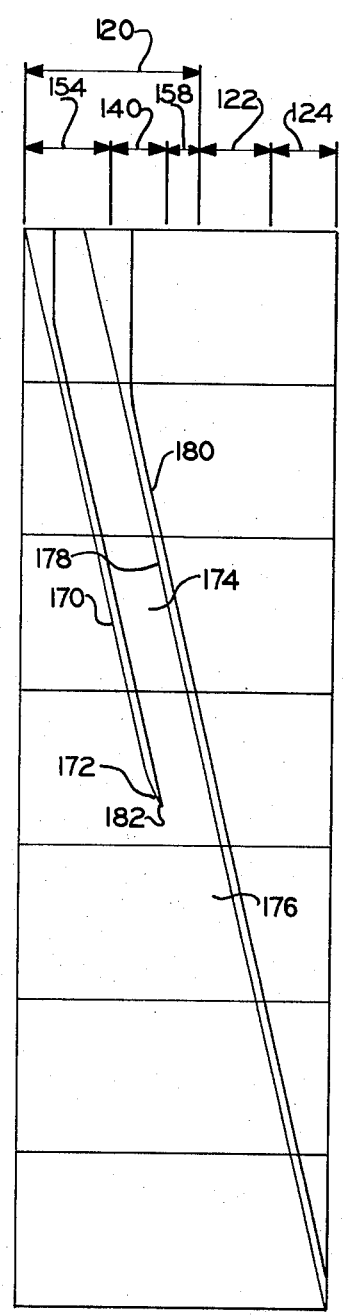
Fig_5  Fig_6  Fig_8

3,866,890

APPARATUS FOR SIMULTANEOUS PLASTICATING AND MIXING

The present invention relates generally to plasticating apparatus and pertains, more specifically, to plasticating extruders which can simultaneously plasticate, or melt, a basic material and mix a specified ingredient with the basic material to prepare a plasticated mixture.

Plasticating extruders are in common use for melting, or plasticating, a solid material, or a molten material having a high viscosity at room temperature. Such extruders employ a screw conveyor which rotates in a cylindrical barrel to move the material through the barrel. The material is heated as it progresses through the barrel and emerges in the desired melted form.

A variety of materials is processed in similar extruders. Among these materials are thermoplastic materials, rubbers, foods for both humans and animals, and even thermosetting materials which undergo a change in viscosity and chemical structure with temperature and residence time in the extruder.

Although most extruders are used to melt and pump a plastic, such as polyethylene, polypropylene, polystyrene, polyvinylchloride and the like, rubber and other plasticizable materials, a considerable number of extruders are used for compounding, i.e., for mixing selected ingredients into a basic plasticizable material. Often, compounding is done prior to extruding so that the process of compounding and then extruding is non-continuous and therefore represents an added cost for processing. It would be desirable, from an economic standpoint, to compound (that is, to mix various ingredients) in a first extruder and then plasticate the mixture in a second extruder so as to achieve a continuous process.

It has been suggested that it would be even more desirable, for economy, to be able to perform compounding and plasticating simultaneously in a single extruder. However, difficulties have arisen in that a produce of acceptable uniformity has been produced only at relatively low rates of production. Attempts at higher rates heretofore have yielded incomplete mixing. For example, where the selected ingredient is a color concentrate mixed with a basic material of another color, streaks of different color can be found in the end product, thereby rendering the product useless.

It is therefore an object of the invention to provide an apparatus for simultaneously plasticating and mixing a basic material and a selected ingredient to enable the use of a single apparatus for the preparation of a suitable plasticated and compounded mixture.

Another object of the invention is to provide apparatus as described above for preparing a suitably plasticated and compounded mixture at a relatively high rate of production.

Another object of the invention is to provide an improved extrusion screw constructed for use in such as apparatus.

Still another object of the invention is to provide an extruder capable of preparing a plasticated mixture from a basic material and one or more selected ingredients and simultaneously pumping the plasticated, or melted mixture, for subsequent use.

A further object of the invention is to provide an effective apparatus for the efficient blending of a variety of materials and ingredients which can be processed by heating simlutaneous with blending.

A still further object of the invention is to provide apparatus of the type described which is compatible with companion apparatus now in use so as to attain increased economy of operation with minimal apparatus replacement.

The above objects, as well as still further objects and advantages, are attained by the invention which may be described briefly as an apparatus for preparing a plasticated mixture from a basic material and a selected ingredient such that the ingredient is mixed throughout the plasticated mixture, the apparatus comprising a barrel extending axially between an upstream end and a downstream end, a screw conveyor in the barrel, a flight on the screw conveyor for conveying material axially downstream along the barrel, the flight having a leading face facing downstream and a trailing face facing upstream, the flight defining a channel between the leading face and the trailing face, through which channel the material will pass as the material is conveyed downstream, means for supplying the basic material to the channel, means for supplying the ingredient to the channel separate from the basic material, and means for confining the ingredient to a portion of the channel at least until the remainder of the channel is supplied with the basic material.

The invention will be more fully understood, while still further advantages thereof will become apparent, in the following detailed description of preferred embodiments of the invention illustrated in the accompanying drawing, in which:

FIG. 1 is a schematic representation of a typical plasticating extruder now in common use;

FIG. 2 is an enlarged, cross-channel cross-sectional view of a portion of the channel in the extruder of FIG. 1;

FIG. 3 is a schematic representation of a plasticating extruder constructed in accordance with the invention;

FIG. 4 is an enlarged, cross-channel cross-sectional view of a portion of the channel of the extruder of FIG. 3;

FIG. 5 is a planar development of the flights of the screw conveyor of the extruder of FIG. 3;

FIG. 6 is a planar development of an alternate arrangement of flights on another screw conveyor constructed in accordance with the invention;

FIG. 7 is an enlarged, cross-channel cross-sectional view of a portion of the channel of the screw conveyor of FIG. 6; and FIG. 8 is a planar development of another alternate arrangement of flights on still another screw conveyor constructed in accordance with the invention.

Referring now to the drawing, and especially to FIGS. 1 and 2 thereof, a plasticating extruder of the type now in common use is illustrated schematically at 10 and is seen to include a barrel 12 extending axially between an upstream end 14 and a downstream end 16, and a screw conveyor 18 in the barrel. The purpose of the illustrated arrangement is to melt, or plasticate, a solid material, or a molten material having a high viscosity at room temperature, and to deliver, or pump, the plasticated material to a further apparatus, such as a molding machine, a die or the like. A reservoir of solid material 20 is held in a hopper 22 which communicates with the inner chamber 24 of the barrel 12 adjacent the upstream end 14 and feeds the solid material 20 into a channel 26 defined by a helical flight 28 on the screw conveyor 18. Rotation of the screw conveyor 18 within the barrel as will advance the material 20 along the channel 26 in a downstream direction 30 until the material is delivered, in melted form, to the discharge point 32 at the downstream end 16 of the barrel.

Extruder 10 may be divided into several functional zones; namely, a solids conveying zone 34, which includes a hopper zone 36 and a delay zone 38, a melting zone 40, and a melt conveying zone 42.

The hopper 22 serves as a reservoir for the solid material 20 and ensures that solids are continuously supplied to the extruder. The solids enter the solids conveying zone 34 at the hopper zone 36 and are conveyed by the screw conveyor 18 to the delay zone 38. The solids conveying zone 34 occupies a portion of the channel 26 where no melting of the solid material 20 takes place. The length of the solids conveying zone 34 is roughly defined by the length of the unheated portion of the barrel 12 in the vicinity of the hopper 22. The function of the zone 34 is to compact the solids in the channel into a solid bed 44.

The delay zone 38 starts at the point where the inner surface 46 of the barrel 12 reaches the melting point of the material 20, either as a result of heat conducted through a heated barrel, or because of frictional heat generated by the solid bed 44 rubbing against the barrel. The melt generated at the inner surface 46 of the barrel 12 forms a continuous film 50, provided that the solid bed 44 is sufficiently compacted. Compacting of the solid bed 44 depends upon the effectiveness of the solids conveying zone 34. Over the whole length of the delay zone 38, melt appears only in the film 50 between solid bed 44 and the inner surface 46 of the barrel 12.

The melting zone 40 begins at the point where the delay zone 38 ends and where a melt pool 52 starts to form, cross-channel between the leading face 54 of the flight 28, which faces downstream, and the confronting trailing face 56 of the flight 28, which faces upstream. Referring now to FIG. 2, as well as to FIG. 1, the melt pool 52 is juxtaposed with the leading face 54 of the flight 28 and gradually replaces the progressively melting solid bed 44 throughout the length of the melting zone 40. The melting zone 40 usually occupies the major portion of the length of the extruder 10.

As illustrated in more detail in FIG. 2, the melt film 50, which is generated at the inner surface 46 of the barrel 12, is continuously fed from the solid bed 44 and, as the volume of the solid bed decreases, and the volume of the melt increases, the melt spills into the low shear melt pool 52. As the melting process continues, the melt pool 52 grows in volume while the solid bed 44 decreases in volume.

The melt conveying zone 42 is the last functional zone of the extruder 10 and identifies the portion of the extruder where no unmelted solids remain. In zone 42, melted material is pumped to the discharge point 32 at end 16 of the barrel.

When it is desired to employ an extruder such as extruder 10 for compounding or mixing a basic material and a specified ingredient, the material and the ingredient are ordinarily intermingled when in the solid state and then placed within the hopper so as to be supplied to the channel of the screw conveyor in an intermixed state. Successive portions of the intermixed solid bed are then melted within the melting zone until melting is complete.

It has been determined that the mixing efficiency of a plasticating extruder can be improved considerably by supplying the basic material and the selected ingredient to the channel unmixed, and by confining the ingredient to the portion of the channel which is juxtaposed with the trailing face of the flight, the remaining portion of the channel being filled with the basic material. In this manner the ingredient, as it melts, is forced to travel the whole width of the channel in the thin melt film before the melted ingredient spills into the low shear melt pool intermixed with the melted basic material.

Turning now to FIGS. 3 through 5, a plasticating extruder constructed in accordance with the invention is illustrated generally at 110. Extruder 110, like extruder 10, includes a barrel 112, extending axially between an upstream end 114 and a downstream end 116, and a screw conveyor 118 in the barrel. Extruder 110 is also divided into a plurality of functional zones including a solids conveying zone 120, a melting zone 122 and a melt conveying zone 124.

A main flight 128 on the screw conveyor 118 conveys material axially downstream along the barrel 112 and includes a leading face 130 facing downstream and a trailing face 132 facing upstream, the main flight 128 thus defining a main channel 134 between the leading face 130 and the trailing face 132, through which channel the material will pass as the material is conveyed downstream. The main channel 134 terminates upstream at terminus 136 and a first hopper 138 communicates with the main channel at the upstream terminus 136 for supplying a basic material to the main channel 134 within a first hopper zone 140. In this instance, the basic material is a virgin plastic 142 such as polyethylene, polypropylene, polystyrene, or polyvinylchloride and the like. A selected ingredient, here illustrated in the form of a color concentrate 144, is to be mixed with the virgin plastic 142 so as to impart a chosen color to the completed mixture. It is desired that the color will be uniform throughout the melted plastic mixture which will be delivered at the discharge end 146 of the apparatus.

The color concentrate 144 is supplied from a reservoir retained in a second hopper 148 which is located upstream from the first hopper 138 and which communicates with an auxiliary channel 150 which is defined by an auxiliary flight 152 on the screw conveyor 118 and which extends in an upstream direction beyond the upstream terminus 136 of the main channel 134 so that the second hopper 148 communicates with the auxiliary channel 150 upstream of the terminus 136 of the main channel in a second hopper zone 154. Upon rotation of the screw conveyor 118 the color concentrate 144 will fill the auxiliary channel 150 and will be confined so as to remain immediately behind the trailing face 132 of the main flight 128, while the virgin plastic 142 will fill the remainder of the main channel 134 between the leading face 130 of the main flight 128 and the trailing face 156 of the auxiliary flight 152. Since the auxiliary channel 150 becomes filled with color concentrate 144 upstream of where the auxiliary channel communicates with the first hopper 138, virgin plastic 142 will not enter the auxiliary channel 150 but will fill the remainder of the main channel 134. Alternately, the second hopper 148 may be provided with a mixture of color concentrate and virgin plastic which will then be fed to the auxiliary channel; however, the main channel will contain no color concentrate. Thus, as the solids enter delay zone 158, the color concentrate 144 is segregated from the virgin plastic 142 and is confined to the area immediately behind the main flight 128.

As the melt film 160 forms, the film will be fed from both main channel 134 and auxiliary channel 150 and, since the auxiliary channel is located downstream of the main channel, as viewed in FIG. 4, the melted color concentrate will be forced to traverse the length of the melt film 160 between the confronting leading and trailing faces 130 and 132, respectively, of the main flight 128 before the film spills into the melt pool 162. In addition, the color concentrate which enters the melt pool 162 is subjected to circulation within the melt pool. Thus, the combined effect of the movement which takes place within the melt film 160 and within the melt pool 162 will assure thorough mixing of the color concentrate 144 with the virgin plastic 142. By the time that all of the color concentrate and virgin plastic is melted, thorough mixing has taken place.

While the auxiliary flight may have the same overall diameter as the main flight so that the clearance between the auxiliary flight and the internal surface 164 of the barrel 112 would equal the clearance between the main flight and that surface, it is preferable to provide the auxiliary flight 152 with a somewhat smaller overall diameter than the overall diameter of the main flight 128 so as to enable the formation of a continuous melt film 160 across both the auxiliary channel 150 and the main channel 134, as illustrated in FIG. 4. In this manner, the mechanism of feeding the color concentrate 144 to the melt film 160 for increased mixing efficiency is very effective.

In order to compensate for the depletion of color concentrate 144 from auxiliary channel 150 while assuring that all of the color concentrate must cross the auxiliary flight 152 before leaving the auxiliary channel, the volume of the auxiliary channel is progressively decreased in the downstream direction by progressivley decreasing the axial spacing between the auxiliary flight 152 and the trailing face 132 of the main flight 128 in the downstream direction. Thus, as best seen in FIGS. 3 and 5, the axiliary channel 150 can slowly become narrower axially as the material melts. In this manner the flow of color concentrate 144 into the melt film 160, across the main channel 134 and into the melt pool 162 will be assured. It is noted that the decreasing volume between the auxiliary flight 152 and the trailing face 132 of the main flight 128 is accompanied by an increasing volume between the auxiliary flight and the leading face 130 so that the total volume of the conveyed material is accommodated by the screw conveyor 118.

Alternately, as illustrated in FIGS. 6 and 7, the volume of an auxiliary channel 150A established by flight 152A of screw conveyor 118A be decreased by gradually decreasing the radial depth d of the auxiliary channel 150A in the downstream direction.

In some instances, it is desirable that the auxiliary channel be completely blocked to assure that all material in the auxiliary channel must cross the auxiliary flight before leaving the auxiliary channel and entering the remainder of the main channel. Thus, as illustrated in FIG. 5, the auxiliary flight 152 may be made to approach the trailing face 132 of the main flight 128 in the downstream direction until the auxiliary flight merges with the main flight to close off the auxiliary channel 150 and force material from the auxiliary channel over the auxiliary flight into the remainder of the main channel. In the alternate embodiment of FIGS. 6 and 7, the auxiliary channel 150A also may be closed off at 168 where the auxiliary channel merges with the outside diameter of the screw conveyor 118A.

With some combinations of materials, the auxiliary channel need not extend downstream beyond the point where the auxiliary channel becomes filled with the selected ingredient. Thus, as illustrated in FIG. 8, an alternate auxiliary flight 170 may taper off at 172 and terminate within the solids conveying zone 120, rather than extend into the melting zone 122 as illustrated in the embodiment of FIGS. 3 through 5, so that the auxiliary channel 174 merges with the main channel 176. In this instance, the auxiliary channel 174 will serve to confine the selected ingredient to the area immediately behind the trailing face 178 of the main flight 180; however, once both channels 174 and 176 are filled, the relative positions of the segregated basic material and the added ingredient will be retained, by virtue of all of the material being compacted in these relative positions while solid, and will remain in those relative positions beyond the downstream terminus 182 of the auxiliary flight.

While the above embodiments have been described in terms of adding color concentrate or pigments as the selected ingredient to a virgin basic material, it will be apparent that other ingredients could be mixed in an extruder constructed in accordance with the invention. For example, such extruders are useful in mixing other inert materials, such as glass, with a plastic basic material. In addition, extruders constructed in accordance with the invention can be highly useful in processes where blending various viscous liquids, liquids with solids, and melting is desired such as in candy making, cereal manufacturing, noodle and spaghetti manufacture, chocolate making, and in the preparation of pet foods. In some of these processes, the mixture is also cooked in the extruder.

It is to be understood that the above detailed description of various embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for preparing a plasticated mixture from a basic material and at least one selected ingredient such that the ingredient is mixed throughout the plasticated mixture, said apparatus comprising:
 a barrel extending axially between an upstream end and a downstream end;
 a screw conveyor in the barrel;
 a flight on the screw conveyor for conveying material axially downstream along the barrel, said flight having a leading face facing downstream and a trailing face facing upstream;
 said flight defining a channel between the leading face and the trailing face, through which channel said material will pass as the material is conveyed downstream;

means for supplying the basic material to the channel;

means for supplying the ingredient to the channel separate from the basic material; and means for confining the ingredient to a portion of the channel at least until the remainder of the channel is supplied with the basic material.

2. The invention of claim 1 wherein said portion of the channel is juxtaposed with the trailing face of the flight and the remainder of the channel is between said portion and the leading face of the flight.

3. The invention of claim 1 wherein the means for supplying the basic material is located downstream of the means for supplying ingredient.

4. Apparatus for preparing a plasticated mixture from a basic material and at least one selected ingredient such that the ingredient is mixed relatively uniformly throughout the plasticated mixture, said apparatus comprising:

a barrel extending axially between an upstream end and a downstream end;

a screw conveyor in the barrel;

a main flight on the screw conveyor for conveying material axially downstream along the barrel, said flight having a leading face facing downstream and a trailing face facing upstream;

said flight defining a main channel extending between the leading face and the trailing face, through which channel said material will pass as the material is conveyed downstream, said main channel having an upstream terminus;

an auxiliary flight on the screw conveyor;

said auxiliary flight defining an auxiliary channel spaced axially from the leading face of the main flight and juxtaposed with the trailing face thereof, said auxiliary channel extending upstream beyond the upstream terminus of the main channel and terminating downstream axially short of the downstream extent of the main channel;

means communicating with the main channel for supplying the basic material to the main channel; and means communicating with the auxiliary channel upstream of the upstream terminus of the main channel for supplying the ingredient to the auxiliary channel before basic material is supplied to the main channel.

5. The invention of claim 4 wherein the axial spacing between the main flight and the auxiliary flight decreases in a downstream direction such that the axial width of the auxiliary channel decreases as the auxiliary channel progresses downstream.

6. The invention of claim 5 wherein the auxiliary flight merges into the main flight in the downstream direction.

7. The invention of claim 4 wherein the main channel and the auxiliary channel each have a given radial depth and the radial depth of the auxiliary channel decreases in the downstream direction.

8. The invention of claim 4 wherein the auxiliary channel merges gradually into the main channel in the downstream direction.

9. The invention of claim 4 wherein the main channel includes a solids conveying zone, a melting zone downstream of the solids conveying zone, and a melt conveying zone downstream of the melting zone, and said auxiliary channel merges into the main channel in the solids conveying zone.

10. The invention of claim 4 wherein the main channel includes a solids conveying zone, a melting zone downstream of the solids conveying zone, and a melt conveying zone downstream of the melting zone, and said auxiliary channel extends into the melting zone.

11. The invention of claim 10 wherein the overall outside diameter of the screw in the melting zone is somewhat smaller than the outside diameter of the barrel in the melting zone to provide a clearance between the screw conveyor and the barrel and the overall outside diameter of the auxiliary flight is somewhat smaller than the overall diameter of the main flight so that the clearance between the auxiliary flight and the barrel is greater than the clearance between the main flight and the barrel.

12. A screw conveyor for use in an apparatus in which a plasticated mixture is prepared from a basic material and at least one selected ingredient such that the ingredient is mixed relatively uniformly throughout the plasticated mixture while being conveyed axially through a barrel from an upstream location toward a downstream location, said screw conveyor comprising:

a main flight on the screw conveyor for conveying material axially downstream along the barrel, said flight having a leading face facing downstream and a trailing face facing upstream;

said flight defining a main channel extending between the leading face and the trailing face, through which channel said material will pass as the material is conveyed downstream, said main channel having an upstream terminus;

an auxiliary flight on the screw conveyor;

said auxiliary flight defining an auxiliary channel spaced axially from the leading face of the main flight and juxtaposed with the trailing face thereof, said auxiliary channel extending upstream beyond the upstream terminus of the main channel and terminating downstream axially short of the downstream extent of the main channel.

13. The invention of claim 12 wherein the axial spacing between the trailing face of the main flight and the auxiliary flight decreases in a downstream direction such that the axial width of the auxiliary channel decreases as the auxiliary channel progresses downstream.

14. The invention of claim 13 wherein the auxiliary flight merges into the main flight in the downstream direction.

15. The invention of claim 12 wherein the main channel and the auxiliary channel each have a given radial depth and the radial depth of the auxiliary channel decreases in the downstream direction.

16. The invention of claim 12 wherein the auxiliary channel merges gradually into the main channel in the downstream direction.

17. The invention of claim 12 wherein the main channel includes a solids conveying zone, a melting zone downstream of the solids conveying zone, and a melt conveying zone downstream of the melting zone, and said auxiliary channel merges into the main channel in the solids conveying zone.

18. The invention of claim 12 wherein the main channel includes a solids conveying zone, a melting zone downstream of the solids conveying zone, and a melt conveying zone downstream of the melting zone, and said auxiliary channel extends into the melting zone.

* * * * *